March 9, 1954 J. E. FOLEY 2,671,357
TORQUE CONVERTER TRANSMISSION
Filed May 28, 1949
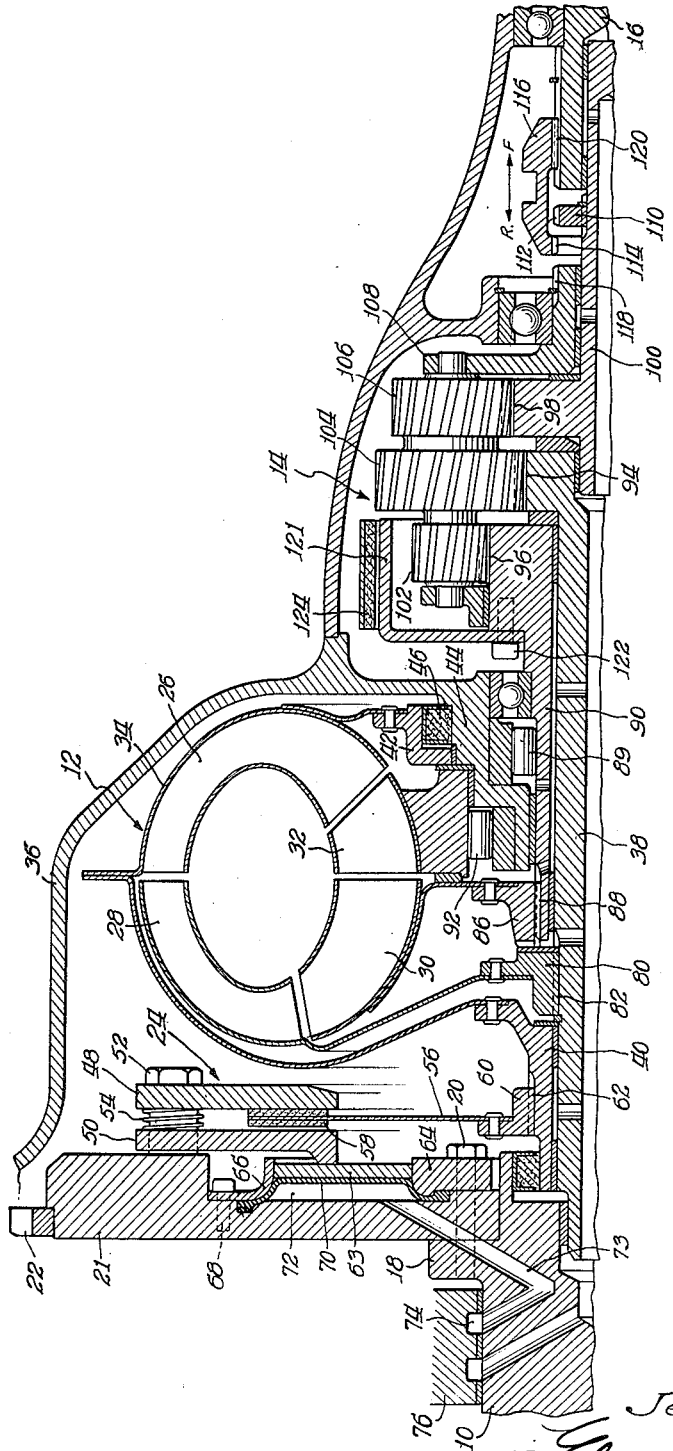
Inventor:
Jerald E. Foley
By Edward C. Fitzhugh
Atty.

Patented Mar. 9, 1954

2,671,357

UNITED STATES PATENT OFFICE 2,671,357

TORQUE CONVERTER TRANSMISSION

Jerald E. Foley, Grosse Pointe Woods, Mich., assignor to Borg-Warner Corporation, Chicago, Ill., a corporation of Illinois Application May 28, 1949, Serial No. 96,009

10 Claims. (Cl. 74—677)

The present invention relates to transmissions and more particularly to combined fluid and mechanical transmissions for effecting variable drive speed relations between the driving and driven members of an automotive power transmission device.

Briefly, the invention contemplates the provision of a transmission including a fluid transmission and a mechanical transmission, each operative to develop torque during normal operation of the transmission.

It is an object of the invention to provide a simple form of fluid drive mechanism arranged to derive power from the driving member thereof and thence employ the derived power so as to automatically effect different speed ratios through the mechanical mechanism associated therewith.

In carrying out the above-mentioned object, the invention contemplates the provision of a combined fluid drive mechanism or transmission and a mechanical drive mechanism or transmission. The fluid drive transmission is in the form of a hydrodynamic torque converter having an impeller section and a pair of turbine sections, while the mechanical transmission is in the form of a planetary gear set. The turbine elements of the fluid drive transmission are operatively connected to the mechanical drive transmission in such a manner that during the initial stage of operation of the fluid transmission one of them progressively develops sufficient torque multiplication to impart driving torque to certain elements of the mechanical transmission tending to drive the vehicle progressively in a forward direction, after which, during the second stage, the other turbine element progressively develops sufficient torque multiplication to impart driving torque to other elements of the mechanical transmission in such a manner as to modify the operation of the transmission so that the additional torque supplied by the latter turbine operates to gradually increase the driving speed ratio of the mechanical transmission until such a time as the driven element of the latter is being driven at substantially the same rate as the driving element of the impeller of the fluid drive transmission.

By an arrangement such as has briefly been outlined above, there is provided a transmission assembly including a fluid drive transmission and a mechanical transmission, both of which operate in a collective manner, during acceleration of the vehicle from a standstill to cruising speed, to increase the driving speed ratio uniformly and gradually over a wide range of speed ratios until such a time as a substantially direct drive is attained between the engine and the vehicle wheels at which time the fluid transmission is operating in the manner of a fluid coupling and the mechanical transmission, which is in the form of a planetary gear set, rotates as a unit, thus effecting a one-to-one driving ratio between the impeller section of the fluid drive transmission and the driving wheels of the vehicle.

According to the present invention and by virtue of the specific construction employed to carry out the principles thereof, during normal automatic operation of the transmission at relatively low gear ratios a free-wheeling or coasting effect of the vehicle prevails until such time as the vehicle gains sufficient speed and a higher gear ratio is in effect. It is among the objects of the present invention, therefore, to provide a manually controllable means whereby this free-wheeling effect may be eliminated, if desired, as for example, for hill braking purposes and the like.

The provision of a transmission of the character briefly outlined above being the principal object of the invention, other objects and advantages thereof, not at this time enumerated, will become more readily apparent as the nature of the invention is better understood.

In the accompanying single sheet of drawing, one embodiment of the invention has been shown. In this drawing, the figure is a sectional view taken substantially centrally through a transmission constructed in accordance with the principles of the present invention.

Referring now to the drawing in detail, the driving shaft 10 of the vehicle engine (not shown) is adapted to operate through an hydraulic or fluid drive transmission in the form of a torque converter 12 and through a mechanical transmission in the form of a planetary gear set 14 to drive the driven shaft 16 at variable rates of speed in a manner that will become apparent presently.

The drive shaft 10 is provided with an annular attachment flange 18 to which there is bolted as at 20 an engine flywheel 21 having the usual starting gear 22 associated therewith. A clutch designated in its entirety at 24 serves to operatively connect the flywheel 21 to the impeller element or section 26 of the torque converter 12.

The torque converter includes, in addition to the impeller 26, a primary turbine element or section 28, a secondary turbine element or section 30 and a stator 32. The impeller element 26 is suitably secured to the impeller casing 34 and the latter is rotatably disposed within a fixed transmission casing 36. The torque converter 12 is coaxial with a power-receiving shaft 38, the forward end of which is piloted within the rear end of the drive shaft 10. One inner edge of the impeller casing 34 is riveted or otherwise secured to a sleeve 40 which is rotatably disposed on the shaft 38. The other inner edge of the casing is likewise riveted or otherwise secured to a ring member 42 which is rotatably disposed on an inwardly extending hub 44 provided on the fixed casing 36. A fluid seal 46 is provided between the ring 42 and the hub 44.

The clutch 24 which serves to connect the impeller element 26 to the flywheel 21 includes a clutch pressure plate 48 which is fixed relative to the flywheel 21 and an axially slidable clutch pressure plate 50, the former pressure plate being fixedly mounted on a stud 52 extending from the flywheel 21 and the latter pressure plate being slidable on the stud. A coil spring 54 surrounding the stud 52 serves to maintain the two pressure plates separated. The clutch 24 includes a driven disc 56 having clutch facings 58 thereon which are disposed in opposed relationship to the pressure plates 48 and 50 respectively. The driven disc 56 is riveted or otherwise secured to a hub 60 which is splined as at 62 to the sleeve 40. From the above description, it will be seen that when the pressure plate 50 is moved toward the clutch plate 48, the surfaces of these two plates will engage the friction facings 58 of the disc 56, thus picking up the disc and causing the same, and consequently the impeller casing and its attached impeller elements, to rotate in unison with the flywheel 21, thus establishing a direct drive between the flywheel 21 and impeller section 26 of the torque converter 12.

In order to actuate the pressure plate 50, the lower end thereof bears against the rear surface of a ring-like piston 63 which is slidably positioned between a pair of centering devices or guides 64 and 66 respectively, the former being secured to the flywheel 21 by means of the studs 20 and the latter being secured to the flywheel by means of screws 68. The centering devices 64 and 66 also function as clamping elements to clamp the edges of a flexible diaphragm 70 against the surface of the flywheel 21 and thus create an annular fluid chamber 72 between a surface of the flywheel 21 and the diaphragm 70. The chamber 72 communicates with a duct 73 extending through the shaft 10 and flywheel 21 and which duct in turn communicates with a groove 74 formed in an annular member 76 surrounding the shaft 10. Fluid pressure is adapted to be supplied to the groove 74 in any suitable manner by means (not shown) operable under the control of the operator of the vehicle.

The primary turbine 28 of the torque converter 12 is secured to a ring member 80 which is splined as at 82 to the power-receiving shaft 38 so that these two parts may rotate in unison. The secondary turbine 30 is secured to a ring 86 which is splined as at 88 to a sleeve shaft 90 surrounding the power-receiving shaft 38. A one-way brake device 89 is interposed between the inner, stationary hub 44 of the casing 36 and the sleeve shaft 90 for purposes that will become apparent presently. The stator element 32 is rotatably mounted on the internal hub 44 of the fixed casing 36 and a one-way brake device 92 is disposed between these two parts to prevent rotation of the stator element 32 in one direction.

The mechanical transmission 14 is in the form of an "all spur" planetary gear set and includes a sun gear 94 integrally formed on the power-receiving shaft 38. The gear set also includes a second sun gear 96 integrally formed on the sleeve shaft 90. A third gear 98 is integrally formed on a shaft 100, the forward end of which is piloted within the rear end of the power-receiving shaft 38. The three sun gears 96, 94 and 98 are in constant mesh with respective planetary gears 102, 104 and 106, these latter planet gears being integrally formed or connected to one another as a cluster for rotation in unison and the gear cluster or assembly is rotatably mounted in a planet carrier 108 which is rotatably disposed at its forward end on the sleeve shaft 90 and at its rear end on the shaft 100. The diameters of the three planet gears 102, 104 and 106 vary, the gear 102 being of least diameter and the gear 104 being of largest diameter.

The sun gears 96, 94 and 98 and their respective planet gears 102, 104 and 106 together with the carrier 108 constitute a planetary gear set of the mechanical transmission 14 and it is to be noted that the particular type of planetary gear set shown herein possesses no outer or ring gear.

The shaft 100 has mounted thereon and keyed thereto a clutch element 110 having teeth 112 associated therewith. The planet carrier 108 is splined as at 118. A shiftable collar 116 is splined as at 120 to the driven shaft 16 and is provided with a series of internal teeth 114 designed for selective engagement with the teeth 118 on the carrier 108 or with the teeth 112 on the element 110. From the above description, it will be seen that when the clutch collar 116 is moved to an extreme right-hand position as seen in the drawing, the shaft 100 and the driven shaft 16 will be driven as a unit and when the clutch collar 116 is moved to its extreme left-hand position, the carrier and the driven shaft will be rotated as a unit.

A brake drum 121 is secured as at 122 to the sun gear 96 and has associated therewith a brake band 124 which, when the brake is engaged, operates to maintain the sun gear 96 stationary for applying a reverse drive from the engine to the driven shaft 16 in a manner that will be made clear presently.

In the normal operation of the transmission disclosed herein with the clutch collar 116 moved to its right-hand forward drive position, torque transmitted from the driving shaft 10 is transmitted through the flywheel 21 and clutch device 24 to the pump or impeller section 26 of the torque converter 12, thus energizing the fluid in the toroidal chamber within the impeller casing 34. The energy of the fluid is absorbed by the primary turbine section 28, thus resulting in rotation of the latter and such rotation thereof operates to drive the power-receiving shaft 38 together with its sun gear 94 in a clockwise direction as viewed from the left side of the drawing. During this stage of operation of the transmission, the secondary turbine section 30 will not receive sufficient torque transfer to overcome the reverse action imposed on its respective sun gear 96. The one-way brake device 89 which is interposed between the sleeve shaft 90 and the fixed hub 44 prevents the sun gear 96 from reverse rotation in a counter-clockwise direction. With the sun gear 94 rotating in a clockwise direction as viewed from the left of the drawing, the tendency for the gear cluster 102, 104, 106 will be to rotate in a counter-clockwise direction by virtue of the driving connection between the sun gear 94 and the gear 104. The tractional reaction imposed on the sun gear 98 from the output shaft 16 through the clutch collar 116 will have a tendency to cause the gear 106 to "walk" around the periphery of the sun gear 98 in a counter-clockwise direction, thus carrying with it the carrier 108. Due to the smaller diameter of the gear 102 relative to the diameter of the gear 106, the tendency for the gear 102 to impel the sun gear 96 in a clockwise direction will be more than overbalanced by the planetary motion in a counter-clockwise direction of the gear cluster 102, 104 and 106 and as a consequence, although the gear 102 tends to rotate in a counter-clockwise direction, counter-clockwise movement of the carrier 108 applies torque to the sun gear 96 tending to rotate the latter in a counter-clockwise direction. However, the presence of the one-way brake device 89 offers a resistance to such counter-clockwise movement of the sun gear 96 so that the carrier 108 is restricted in its counter-clockwise movement and the partial reaction afforded by such restriction of the movement of the carrier 108 causes the gear 106, by virtue of its counter-clockwise movement, to drive the sun gear 98 in a clockwise direction against the tractional force of the output shaft 16, thus propelling the vehicle in a forward direction from a position of standstill throughout an infinite number of progressively increasing gear ratios.

As engine speed increases with a consequent increase in the speed of the shaft 10 and the impeller element 26, additional increments of speed are applied to the primary turbine element 28 tending to increase the speed of the sun gear 94 in a clockwise direction as viewed from the left of the drawing. These additional increments of speed applied to the gear 94 cannot overcome the reaction of the carrier 108 which is limited in its counter-clockwise movement by the one-way brake 89 so that these increased increments of speed of the sun gear 94 merely serve to increase the rate of clockwise movement of the sun gear 98, thus progressively increasing the speed of the output shaft 16.

As the speed of the engine and of the vehicle increases still further, the secondary turbine section 30 absorbs further energy from the fluid mass within the casing 34 and produces more torque with the consequence that the sun gear 96 commences to rotate in a clockwise direction as viewed from the left side of the drawing. The net effect of such movement of the sun gear 96 is to slow down the carrier 108 in its counter-clockwise rotation. A further increase in speed of the gear 96 ultimately brings the carrier to a stage wherein it is momentarily stationary and causes an increase in speed of the sun gear 98 and consequently of the shafts 100 and 16. Still further increases in the speed of rotation of the sun gear 96 in a clockwise direction causes the carrier 108 to accelerate in a clockwise direction, thus materially accelerating the rate of turning movement of the sun gear 98 and consequently of the output shaft 16 in a clockwise direction. Eventually the point is reached wherein both of the sun gears 94 and 96 are driven at the same rate of speed with the net result that the planetary gear set becomes locked and its various parts revolve in unison so that a substantially direct drive exists through the planetary gear set. At such a point, the torque converter 12 will operate as a fluid coupling due to the fact that the stator section 32 is connected to the fixed hub 44 by the one-way brake device 92 and is free to rotate in a clockwise direction when the torque converter is no longer multiplying the torque input.

To reverse the direction of rotation of the driven shaft 16 and cause the transmission assembly to drive the vehicle in a reverse direction, it is merely necessary to engage the brake mechanism 121, 124 and to shift the clutch collar 116 to the left as viewed in the drawing. Engagement of the brake mechanism serves to hold the sun gear 96 stationary. Shifting of the clutch collar 116 serves to connect the planet carrier 108 to the driven shaft 16 and to disengage this driven shaft from the shaft 100.

Clockwise motion imparted to the sun gear 94 from the impeller section 26 tends to cause the gear 104 and consequently the gear cluster with which it is associated to be rotated in a counter-clockwise direction. Since the sun gear 96 is held stationary, it now becomes the reaction member of the gear set and the gear 102 is obliged to "walk" around the periphery of the stationary sun gear 96 in a counter-clockwise direction. Since the planet carrier is directly connected through the clutch collar 116 to the output shaft, the shaft 16 is caused to rotate in a reverse or counter-clockwise direction. Although counter-clockwise rotation of the planet gear 106 serves to drive the sun gear 98 and shaft 100 in a counter-clockwise direction as viewed from the left of the drawing, the shaft 100, being disengaged from the driven shaft 16, merely idles without performing any function.

It is to be noted that with the clutch collar 116 moved to its right-hand forward drive position during starting of the vehicle from a standstill and while relatively low gear ratios through the transmission obtain, the one-way brake device 89 which is interposed between the sleeve shaft 90 and the fixed hub 44 prevents the sun gear 96 from reverse rotation in a counter-clockwise direction. A condition of free-wheeling or coasting is thereby in effect and the vehicle driving wheels may thus overrun the low gear ratio drive existing from the driving shaft 10 of the engine. To produce a locked forward speed drive for hill braking purposes, or the like, it is merely necessary for the operator of the vehicle to apply the brake 124 and such application of the brake prevents the free-wheeling device 89 from overrunning so that the driving wheels of the vehicle are positively coupled through the various transmission gears to the engine shaft and the reverse torque thus encountered by the tendency of the vehicle to overrun the prevailing driving speed will be eliminated.

From the above description, it will be seen that the fluid drive transmission mechanism 12 and the mechanical drive transmission mechanism 14 operate jointly to provide a composite transmission assembly whose net effect is to change the driving speed ratio between the drive shaft 10 and the driven shaft 16 from a maximum torque multiplication, as the vehicle leaves a standstill, to a direct drive ratio as the vehicle attains cruising speed. The characteristics of the torque converter and the torque demand, in conjunction with vehicle and engine speed, automatically determine the ratio of torque multiplication involved.

While I have described my invention in connection with one specific embodiment thereof, it is to be understood that this is by way of illus-

I claim:

1. In a power transmission, the combination of a driving shaft and a driven shaft, a hydrodynamic coupling device including an impeller, a primary turbine and a secondary turbine, means operatively connecting said impeller and driving shaft in driving relationship, one-way engaging means for preventing the reverse rotation of said secondary turbine, a planetary gear set having three sun gears constituting relatively rotatable driving and drive-receiving elements, means operatively connecting one of said sun gears to said driven shaft in driving relationship, means operatively connecting the other sun gears with said primary and secondary turbines respectively, a planet gear meshing with each of said sun gears, said planet gears being integrally formed and constituting a revolvable gear cluster, and a rotatable planet carrier for said gear cluster, said primary turbine functioning initially to drive said driven shaft in a relatively low speed ratio through said planetary gear set with said one-way engaging means engaged, and said secondary turbine functioning subsequently to cause overrunning and consequent disengagement of said one-way engaging means to vary the speed ratio of the drive from said driving shaft to said driven shaft through said gear set and when the secondary turbine approximates the speed of the primary turbine, both turbines functioning to substantially lock up the gear set to establish a substantially direct drive between the shafts.

2. In a power transmission, the combination of a driving shaft and a driven shaft, a hydrodynamic coupling device including an impeller, a primary turbine and a secondary turbine, means operatively connecting said impeller and driving shaft in driving relationship, one-way engaging means for preventing reverse rotation of said secondary turbine, a planetary gear set having three sun gears of different diameters, means operatively connecting the sun gear of least diameter to said primary turbine in driving relationship, means operatively connecting the sun gear of largest diameter to said secondary turbine in driving relationship, means operatively connecting the other sun gear to the driven shaft in driving relationship, a planet gear meshing with each of said sun gears, said planet gears being integrally formed as a cluster, and a rotatable planet carrier for said cluster, said primary turbine functioning initially to drive said driven shaft through said planetary gear set with said one-way engaging means engaged, and said secondary turbine functioning subsequently to cause overrunning and consequent disengagement of said one-way engaging means to vary the speed ratio of the drive from said driving shaft to said driven shaft through said gear set and when the secondary turbine approximates the speed of the primary turbine, both turbines functioning to substantially lock up the gear set to establish a substantially direct drive between the shafts.

3. In a power transmission, the combination of a driving shaft and a driven shaft, a hydrodynamic coupling device including an impeller, a primary turbine and a secondary turbine, means operatively connecting said impeller and driving shaft in driving relationship, one-way engaging means for preventing reverse rotation of said secondary turbine, a planetary gear set having four relatively rotatable driving and drive-receiving elements, means operatively connecting two of said elements with the primary and secondary turbines respectively and clutch means for selectively connecting either of said other two elements directly to the driven shaft for conditioning the transmission for either forward or reverse drive, said primary turbine functioning in forward drive initially to drive said driven shaft through said planetary gear set with said one-way engaging means effective, and said secondary turbine functioning subsequently to cause overrunning of said one-way engaging means to vary the speed ratio of the drive from said driving shaft to said driven shaft through said gear set and when the secondary turbine approximates the speed of the primary turbine, both turbines functioning to substantially lock up the gear set to establish a substantially direct drive between the shafts.

4. In a power transmission, the combination of a driving shaft and a driven shaft, a hydrodynamic coupling device including an impeller, a primary turbine and a secondary turbine, means operatively connecting said impeller and driving shaft in driving relationship, one-way engaging means for preventing reverse rotation of said secondary turbine, a planetary gear set having four relatively rotatable driving and drive-receiving elements including three sun gears and a planet carrier, means operatively connecting two of said sun gears with said primary and secondary turbines respectively, means for selectively connecting either the third sun gear or the planet carrier with said driven shaft for conditioning the transmission for either forward or reverse drive, and means selectively operable at will for holding one of said sun gears stationary for conditioning the transmission for reverse drive, said primary turbine functioning initially in forward drive to drive said driven shaft through said planetary gear set with said one-way engaging means effective, and said secondary turbine functioning subsequently to cause overrunning of said one-way engaging means to vary the speed ratio of the drive from said driving shaft to said driven shaft through said gear set and when the secondary turbine approximates the speed of the primary turbine, both turbines functioning to substantially lock up the gear set to establish a substantially direct drive between the shafts.

5. In a power transmission, a driving shaft, a driven shaft, a fluid drive transmission assembly and a mechanical drive transmission assembly, said fluid drive assembly including a rotary impeller and rotary primary and secondary turbines cooperating to form a power-transmitting fluid circuit, means operatively connecting said impeller and driving shaft for driving the former from the latter in a forward direction, means preventing reverse rotation of said secondary turbine, said primary turbine being rotatable in a forward direction at all speeds of rotation of the impeller, and said secondary turbine being rotatable in a forward direction only at relatively high speeds of the impeller, said mechanical drive transmission including a first sun gear operatively connected to said primary turbine for rotation therewith in unison, a second sun gear operatively connected to said secondary turbine for rotation therewith in unison, a third sun gear, an integral pinion gear cluster including a pinion meshing with each of said sun gears, a rotatable carrier for said gear cluster, and means for selectively connecting either said carrier or said third sun gear to said driven shaft in driving relationship to condition the transmission for reverse or forward drive respectively, said primary turbine functioning initially in forward drive to drive said driven shaft through said planetary gear set with said means for preventing reverse rotation of said secondary turbine being effective, and said secondary turbine functioning subsequently to render said means for preventing reverse rotation of the secondary turbine ineffective in order to vary the speed ratio of the drive from said driving shaft to said driven shaft through said gear set and when the secondary turbine approximates the speed of the primary turbine both turbines functioning to substantially lock up the gear set to establish a substantially direct drive between the shafts.

6. In a power transmission, a driving shaft, a driven shaft, a fluid drive transmission assembly and a mechanical drive transmission assembly, said fluid drive assembly including a rotary impeller and rotary primary and secondary turbines cooperating to form a power-transmitting fluid circuit, means operatively connecting said impeller and driving shaft for driving the former from the latter in a forward direction, means preventing reverse rotation of said secondary turbine, said primary turbine being rotatable in a forward direction at all speeds of rotation of the impeller, and said secondary turbine being rotatable in a forward direction only at relatively high speeds of the impeller, said mechanical drive transmission including a first sun gear operatively connected to said primary turbine for rotation therewith in unison, a second sun gear operatively connected to said secondary turbine for rotation therewith in unison, a third sun gear, an integral pinion gear cluster including a pinion meshing with each of said sun gears, a rotatable carrier for said gear cluster, means for selectively connecting either said carrier or said third sun gear to said driven shaft in driving relationship for conditioning the transmission for reverse or forward drive respectively, said primary turbine functioning initially in forward drive to drive said driven shaft through said planetary gear set with said means for preventing reverse rotation of said secondary turbine being effective, and said secondary turbine functioning subsequently to render said means for preventing reverse rotation of the secondary turbine ineffective in order to vary the speed ratio of the drive from said driving shaft to said driven shaft through said gear set and when the secondary turbine approximates the speed of the primary turbine both turbines functioning to substantially lock up the gear set to establish a substantially direct drive between the shafts, and means selectively operable at will for maintaining the sun gear which is connected to said secondary turbine stationary to condition the transmission for reverse drive.

7. In a power transmission, the combination of a driving shaft and a driven shaft, a hydrodynamic coupling device including an impeller, a primary turbine and a secondary turbine, means operatively connecting said impeller and driving shaft in driving relationship, one-way engaging means for preventing reverse rotation of said secondary turbine, a planetary gear set having three sun gears constituting relatively rotatable driving and drive-receiving elements, means operatively connecting one of said sun gears to said driven shaft in driving relationship, means operatively connecting the other sun gears with said primary and secondary turbines respectively, a planet gear meshing with each of said sun gears, said planet gears being integrally formed and constituting a revolvable gear cluster, a rotatable planet carrier for said gear cluster, said primary turbine functioning initially to drive said driven shaft through said planetary gear set with said one-way engaging means effective and permitting a free-wheel drive between said driving and driven shaft, and said secondary turbine functioning subsequently to cause overrunning and consequent disengagement of said one-way engaging means to vary the speed ratio of the drive from said driving shaft to said driven shaft through said gear set and when the secondary turbine approximates the speed of the primary turbine, both turbines functioning to substantially lock up the gear set to establish a substantially direct drive between the shafts, and means operable at will to prevent overrunning of said one-way engaging means and establish a positive drive between said driving and driven shafts.

8. In a power transmission, the combination of a drive shaft and a driven shaft, a hydrodynamic coupling device including an impeller, a primary turbine and a secondary turbine, means operably connecting said impeller and drive shaft in driving relationship, a planetary gear set having a plurality of relatively rotatable elements, means operably connecting one of said elements with said primary turbine, means operably connecting another of said elements with said secondary turbine, one-way engaging means for preventing reverse rotation of said secondary turbine and the element connected therewith, a clutch associated with said gear set for selectively conditioning the transmission for either forward or reverse drive, said primary turbine functioning in forward drive initially to drive said driven shaft through said planetary gear set with said one-way engaging means effective and said secondary turbine functioning subsequently to cause overrunning of said one-way engaging means to vary the speed ratio of the drive from said drive shaft to said driven shaft through said gear set and when the secondary turbine approximates the speed of the primary turbine, both turbines functioning to substantially lock up the gear set to establish a substantially direct drive between the shafts, and a brake operable at will for preventing any rotation of said secondary turbine and the element connected therewith and effective upon the conditioning of the transmission for reverse drive by said clutch for establishing a reverse drive between said drive and driven shafts and effective upon the conditioning of the transmission for forward drive for establishing a positive forward drive between said drive and driven shafts.

9. In a power transmission, the combination of a drive shaft and a driven shaft, a hydraulic torque converter including an impeller, a primary turbine, a secondary turbine and a reaction element, means operatively connecting said impeller and driving shaft in driving relationship, a first one-way engaging means for preventing reverse rotation of said secondary turbine, a second one-way engaging means for preventing reverse rotation of said reaction element for enabling said hydraulic torque converter to convert torque, a planetary gear set having three sun gears constituting relatively rotatable driving and drive receiving elements, means operatively connecting one of said sun gears to said driven shaft in driving relationship, means operatively connecting the other two sun gears with said primary and said secondary turbines respectively, a planet gear meshing with each of said sun gears, said planet gears being integrally formed and constituting a revolvable gear cluster, and a rotatable planet carrier for said gear cluster, said primary turbine functioning initially to drive said driven shaft in a relatively low speed ratio through said planetary gear set with both of said one-way engaging means being engaged, said secondary turbine functioning subsequently to cause overrunning and a consequent disengagement of said first one-way engaging means to vary the speed ratio of the drive from said driving shaft to said driven shaft through said gear set, said second one-way engaging means thereafter overrunning and enabling forward rotation of said reaction element and the secondary turbine at approximately the speed of the primary turbine and functioning to substantially lock up the gear set to establish a substantially direct drive between the shafts.

10. In a power transmission, the combination of a drive shaft and a driven shaft, a hydraulic torque converter including an impeller, a primary turbine, a secondary turbine and a reaction element, means operatively connecting said impeller and driving shaft in driving relationship, a first one-way engaging means for preventing reverse rotation of said secondary turbine, a second one-way engaging means for preventing reverse rotation of said reaction element for enabling said hydraulic torque converter to convert torque, a planetary gear set having three sun gears of different diameters, means operatively connecting the sun gear of least diameter to said primary turbine in driving relationship, means operatively connecting the sun gear of largest diameter to said secondary turbine in driving relationship, a planet gear meshing with each of said sun gears, said planet gears being integrally formed and constituting a revolvable gear cluster, and a rotatable planet carrier for said gear cluster, said primary turbine functioning initially to drive said driven shaft in a relatively low speed ratio through said planetary gear set with both of said one-way engaging means being engaged, said secondary turbine functioning subsequently to cause overrunning and a consequent disengagement of said first one-way engaging means to vary the speed ratio of the drive from said driving shaft to said driven shaft through said gear set, said second one-way engaging means thereafter overrunning and enabling forward rotation of said reaction element and the secondary turbine at approximately the speed of the primary turbine and functioning to substantially lock up the gear set to establish a substantially direct drive between the shafts.

JERALD E. FOLEY.

References Cited in the file of this patent

UNITED STATES PATENTS

| Number | Name | Date |
|---|---|---|
| 1,026,448 | Marston | May 14, 1912 |
| 2,107,089 | Swennes | Feb. 1, 1938 |
| 2,150,950 | Thoma | Mar. 21, 1939 |
| 2,293,358 | Pollard | Aug. 18, 1942 |
| 2,312,849 | Pollard | Mar. 2, 1943 |
| 2,318,660 | Barrett | May 11, 1943 |
| 2,326,994 | Duffield | Aug. 17, 1943 |
| 2,346,365 | Duffield | Apr. 11, 1944 |
| 2,350,810 | Pentz | June 6, 1944 |
| 2,371,574 | Swennes | Mar. 13, 1945 |
| 2,373,234 | Duffield | Apr. 10, 1945 |
| 2,495,515 | Foley | Jan. 24, 1950 |
| 2,549,125 | Paton | Apr. 17, 1951 |
| 2,590,472 | Soper et al. | Mar. 25, 1952 |
| 2,599,336 | Lemon | June 3, 1952 |